Dec. 2, 1941.  H. VAN TONGEREN  2,265,091
DUST COLLECTOR
Filed Dec. 7, 1940  2 Sheets-Sheet 2

Inventor
HERMANNUS VAN TONGEREN
by his attorneys

Patented Dec. 2, 1941

2,265,091

UNITED STATES PATENT OFFICE 2,265,091

DUST COLLECTOR

Hermannus Van Tongeren, Heemstede, Netherlands

Application December 7, 1940, Serial No. 369,097

1 Claim. (Cl. 183—75)

This invention relates to dust collectors for the concentration and collection of particles of dust from the dust-laden stream of gas or air coming from industrial furnaces or other apparatus.

More especially the invention has to do with the concentrating or separating part of the apparatus, the main object of the invention being to so improve the construction and operation of the concentrating or separating means as to secure greater efficiency in the concentration or separation of the dust particles from the smoke stream or other dust-laden stream from the furnace or other industrial apparatus.

In the accompanying drawings there is illustrated an embodiment of my invention, which however may be carried out in other forms, where its practical application may require.

Figure 1:
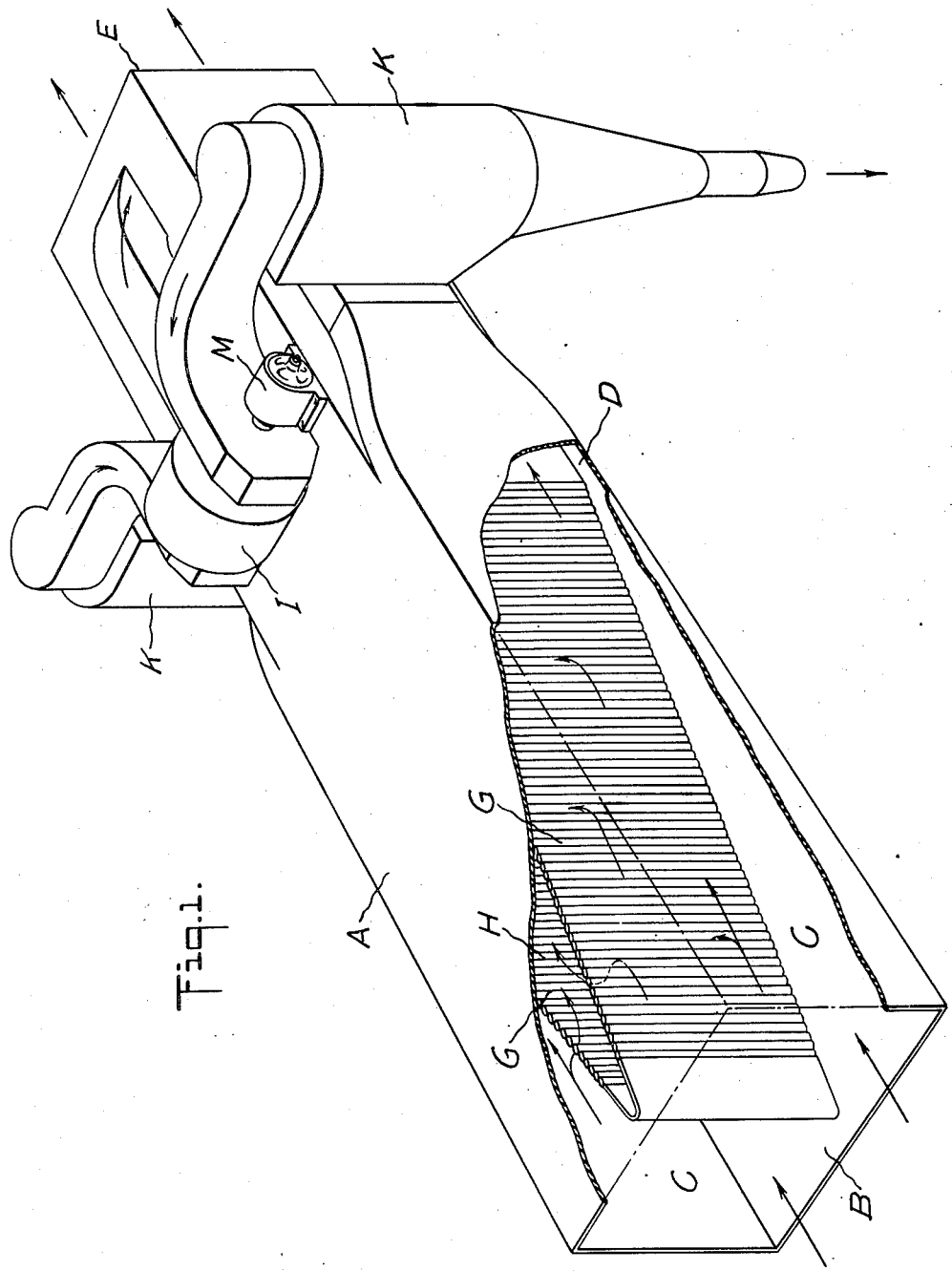
Figure 1 is a perspective view with parts of the casing broken away in order to illustrate features of internal construction.
Figure 2:
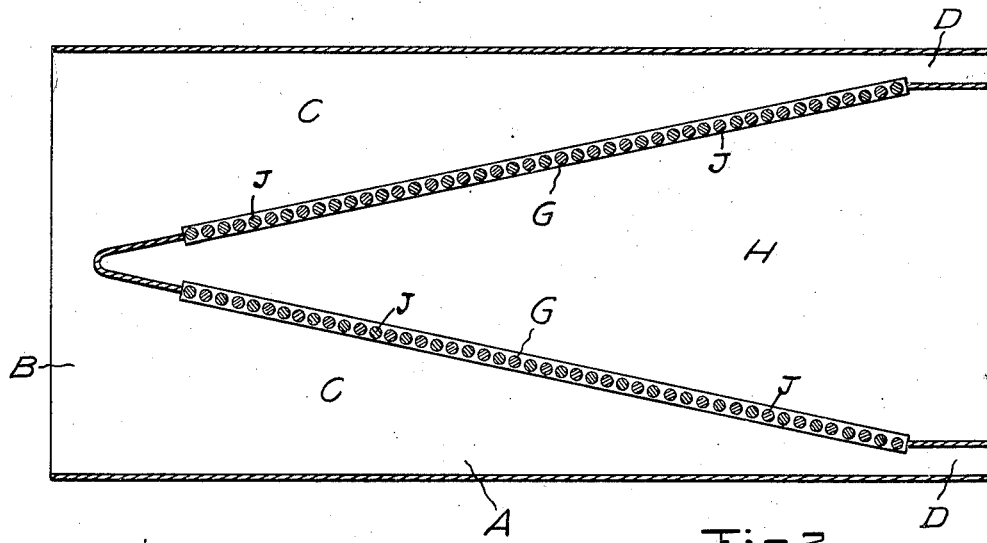
Figure 2 is a sectional plan of a part of the apparatus.
Figure 3:
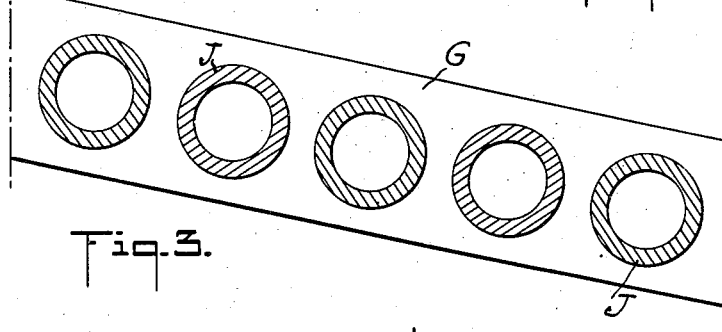
Figure 3 is a sectional plan of a part on a larger scale.
Figure 4:
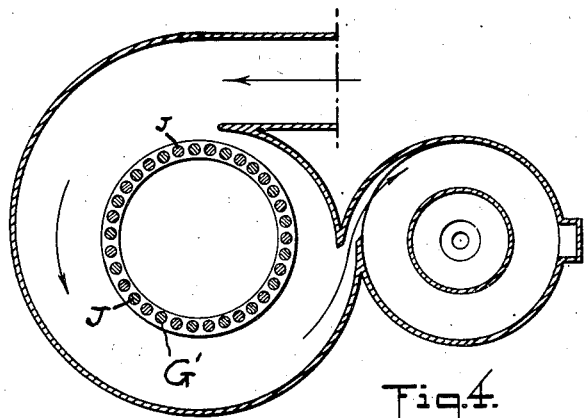

These views Figs. 1, 2 and 3 show the invention as applied to a simple form of wedge type separator; whereas Figure 4 is a sectional plan illustrating the application of the invention to a circular form of dust collector.

By wedge type of dust concentrator is meant a construction of the general character illustrated in varying forms in my Patent 2,152,115, dated March 28, 1939, and in which there is in each case a tapering (and hence wedge shaped) flow passage for the dust-laden gas or air where the concentration of the dust takes place, the practically freed gas or air passing out through openings in a side wall or walls while the concentrated stream of dust is drawn out at the outlet end or ends of the flow passage or passages. A fan, such as a suction fan, may be used to produce the necessary flow of the streams of gas and dust.

A circular type of dust collector is illustrated in my earlier Patent No. 2,039,692, dated May 5, 1936.

Referring to Figs. 1, 2 and 3, illustrating the embodiment of the invention in a wedge type of dust collector, A is a casing, preferably of rectangular cross-section, having at one end the inlet B to two tapering flow passages C, C for the dust-laden gas or air, and outlets at D, D for the concentrated streams of dust, while an outlet at E is provided for the practically cleaned air which has escaped through the openings in the two walls G, G into the intermediate cleaned air conduit H, and thence to the air outlet E.

From the concentrator just described, the concentrated stream of dust particles may be passed into cyclones K of any well-known type, and the dust therefrom be collected at the bottom, while the cleaned gas or air streams from the cyclones are drawn out at their tops by a fan I, driven by a motor M or otherwise. This fan discharges the streams of cleaned gas or air from the cyclones at the outlet E, carrying with them the stream of cleaned gas or air from the conduit H.

The present invention has to do especially with the construction of the side wall of the dust-laden stream flow passage, which has openings in it for the escape of the gas or air. Heretofore it has been customary to construct this wall with flat vanes, set at an angle, as illustrated for example in my above-mentioned patents.

I have found by study and experiment that I can increase the separating efficiency or reduce the draft loss of the apparatus, or both, by constructing the separating wall of a line or series of cylindrical rods J with their axes standing substantially at right angles to the stream flow, and spacing these rods apart not more than half the diameter of each such rod and preferably about a quarter of such diameter, as indicated in the drawings.

My explanation of the reason for this increased efficiency over the flat vanes is that the stream of dust-laden gas or air flowing through the passage C strikes the line of these cylindrical rods tangentially, i. e., in echelon, and the particles of dust hitting these cylindrical surfaces at various points are being constantly bounced off at many angles towards the other side of the flow passage C, and so prevented from being carried with the gas or air into the conduit H. The close juxtaposition of the adjacent rods diminishes the chance of the dust particles to pass between the rods, but owing to the large number of the narrow spaces between the rods there is sufficient opportunity for the gas or air to pass to the conduit H.

A like action takes place when a circular form of dust separator is used with a wall G' of cylindrical rods, as illustrated for example in Fig. 4. These cylindrical rods, whether made solid or tubular, have the further practical advantage that they are strong and their resistance to bending is uniform in all directions in contrast to flat vanes which are strong in one direction only.

I claim as my invention:

A dust separator having a flow passage for the dust-laden gas or air stream, and a conduit for the cleaned gas or air, with a wall separating said passage from said conduit, said separating wall being tangential to the dust-laden stream flow and being composed of cylindrical rods, the axis of each standing substantially at right angles to said flow, and said rods being spaced apart not more than half the diameter of each rod.

HERMANNUS van TONGEREN.